US008625264B2

(12) United States Patent
Kawada

(10) Patent No.: US 8,625,264 B2
(45) Date of Patent: Jan. 7, 2014

(54) DISPLAY DEVICE

(75) Inventor: Kazuki Kawada, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 123 days.

(21) Appl. No.: 13/090,368

(22) Filed: Apr. 20, 2011

(65) Prior Publication Data

US 2011/0261538 A1 Oct. 27, 2011

(30) Foreign Application Priority Data

Apr. 22, 2010 (JP) .................................. 2010-098424

(51) Int. Cl.
*H05K 5/00* (2006.01)
*H05K 7/00* (2006.01)
*H04M 1/00* (2006.01)
*G06F 3/02* (2006.01)

(52) U.S. Cl.
USPC ............ 361/679.21; 361/679.22; 361/679.57; 361/679.58; 455/575.1; 455/575.8; 345/169

(58) Field of Classification Search
USPC ............. 361/679.01, 679.02, 679.08, 679.09, 361/679.21–679.3, 679.55–679.59; 455/575.1, 575.3, 575.4, 575.8, 575.5
See application file for complete search history.

(56) References Cited

U.S. PATENT DOCUMENTS

2009/0237586 A1* 9/2009 Han et al. ..................... 349/58

FOREIGN PATENT DOCUMENTS

| JP | 2008-116523 A | 5/2008 |
| JP | 2009-80229 A | 4/2009 |

* cited by examiner

*Primary Examiner* — Jayprakash N Gandhi
*Assistant Examiner* — Jerry Wu
(74) *Attorney, Agent, or Firm* — Global IP Counselors

(57) ABSTRACT

A display device includes a cabinet and a display device main body. The cabinet has a front cabinet and a rear cabinet. The front cabinet has a rear face and a plurality of bosses. The display device main body has a rear frame with a front opening, a cell guide, a display panel, a bezel and a plurality of fixing components. The rear frame has a plurality of recess portions that is provided at a specific spacing along an outer peripheral part of the rear frame. The display panel is disposed via the cell guide in the front opening of the rear frame. The bezel is fastened to the outer peripheral part of the rear frame. The fixing components are provided at a specific spacing along the outer peripheral part of the rear frame. The fixing components are disposed in the recess portions and fastened to the bosses, respectively.

8 Claims, 6 Drawing Sheets

DISPLAY DEVICE

CROSS-REFERENCE TO RELATED APPLICATIONS

This application claims priority to Japanese Patent Application No. 2010-098424 filed on Apr. 22, 2010. The entire disclosure of Japanese Patent Application No. 2010-098424 is hereby incorporated herein by reference.

BACKGROUND

1. Field of the Invention

The present invention generally relates to a display device. More specifically, the present invention relates to a display device, such as a liquid crystal television set or a liquid crystal monitor.

2. Background Information

A conventional display device, such as a liquid crystal television set, includes a cabinet and a liquid crystal module (see Japanese Laid-Open Patent Application Publication No. 2009-80229, for example). The liquid crystal module includes a rear frame, a liquid crystal panel, a metal bezel, a backlight and a plurality of fixing components. The liquid crystal module is disposed in the cabinet. The cabinet has a front cabinet and a rear cabinet. The liquid crystal panel is disposed in a front opening of the rear frame. The metal bezel has a substantially L-shaped lateral cross section and covers an outer peripheral edge of the liquid crystal panel. The metal bezel is fastened to an outer peripheral part of the rear frame. The backlight is disposed inside the rear frame. The fixing components have protruding tabs, respectively. The protruding tabs are integrally provided at a specific spacing around the outer peripheral part of the rear frame. The protruding tabs extending outward relative to the outer peripheral part of the rear frame. The fixing components are fastened with screws to bosses that are integrally formed on a rear face of the front cabinet.

With the conventional display device, the fixing components of the liquid crystal module protrude outside the rear frame. Thus, there is the risk that the fixing components will contact with an assembly machinery or the like while the liquid crystal module is being conveyed in an assembly process, and be bent or broken. Furthermore, this ends up resulting in a lower yield for the liquid crystal module.

Also, the liquid crystal module is thin and does not stand much bending stress. Thus, if the liquid crystal module is subjected to an impact or a heavy load during its conveyance, then the liquid crystal module is deformed or malfunction.

SUMMARY

The present invention is conceived in light of the above-mentioned problems. One object of the present invention is to provide a display device that stands more stress and has a good yield.

In accordance with one aspect of the present invention, a display device includes a cabinet and a display device main body. The cabinet has a front cabinet and a rear cabinet. The front cabinet has a rear face and a plurality of bosses that is integrally formed on the rear face. The display device main body is disposed inside the cabinet. The display device main body has a rear frame with a front opening, a cell guide, a display panel, a bezel and a plurality of fixing components. The rear frame has a plurality of recess portions that is provided at a specific spacing along an outer peripheral part of the rear frame. The cell guide is disposed on the rear frame. The display panel is disposed via the cell guide in the front opening of the rear frame. The bezel is disposed on an outer peripheral edge portion of the display panel. The bezel is fastened to the outer peripheral part of the rear frame. The fixing components are provided at a specific spacing along the outer peripheral part of the rear frame. The fixing components are disposed in the recess portions and fastened to the bosses, respectively.

With the display device, it is possible to provide a display device that stands more stress and has a good yield.

These and other objects, features, aspects and advantages will become apparent to those skilled in the art from the following detailed description, which, taken in conjunction with the annexed drawings, discloses a preferred embodiment.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from these disclosures that the following descriptions of the selected embodiments are provided for illustration only and not for the purpose of limiting the invention as defined by the appended claims and their equivalents.

First Embodiment

Figure 1:
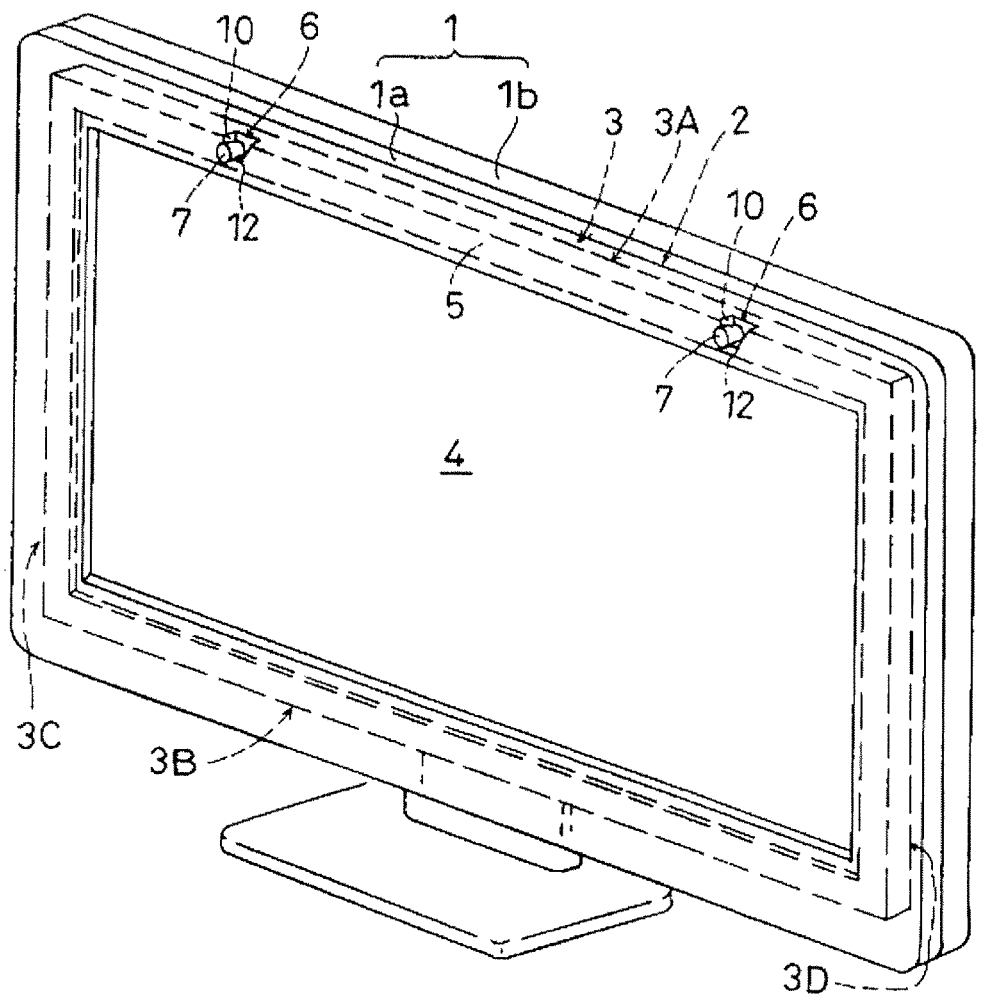
FIG. 1 is a perspective view of a display device in accordance with a first embodiment.
Figure 2:
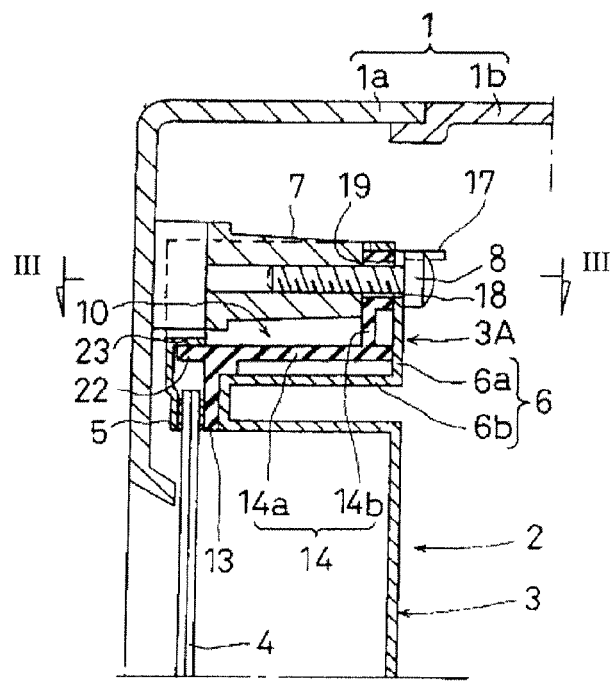
FIG. 2 is a partial cross sectional view of the display device illustrated in FIG. 1.

FIGS. 1 to 5 illustrate a display device in accordance with a first embodiment. The display device is a liquid crystal television set, a liquid crystal monitor, a flat panel (or thin-type) display device and so forth. As illustrated in FIG. 1, the display device includes a cabinet 1 and a liquid crystal module (e.g., display device main body) 2. The liquid crystal module 2 is disposed in the cabinet 1. The cabinet 1 has a front cabinet 1a and a rear cabinet 1b. The liquid crystal module 2 includes a rear frame 3, a liquid crystal panel (e.g., display panel) 4, a metal bezel 5, a backlight (not shown), a plurality of fixing components 6 and a cell guide 13. The liquid crystal panel 4 is disposed in a front opening of the rear frame 3. The bezel 5 has a substantially L-shaped lateral cross section and covers an outer peripheral edge (e.g., outer peripheral edge portion) of the liquid crystal panel 4. The bezel 5 is fastened to outer peripheral parts 3A to 3D of the rear frame 3. The backlight (not shown) is disposed inside the rear frame 3. The fixing components 6 are integrally provided at a specific spacing along the outer peripheral part 3A of the rear frame 3. The fixing components 6 are fastened with screws 8 to bosses 7 that protrude integrally from a rear face of the front cabinet 1a. The cell guide 13 is disposed on the rear frame 3.

Figure 5:
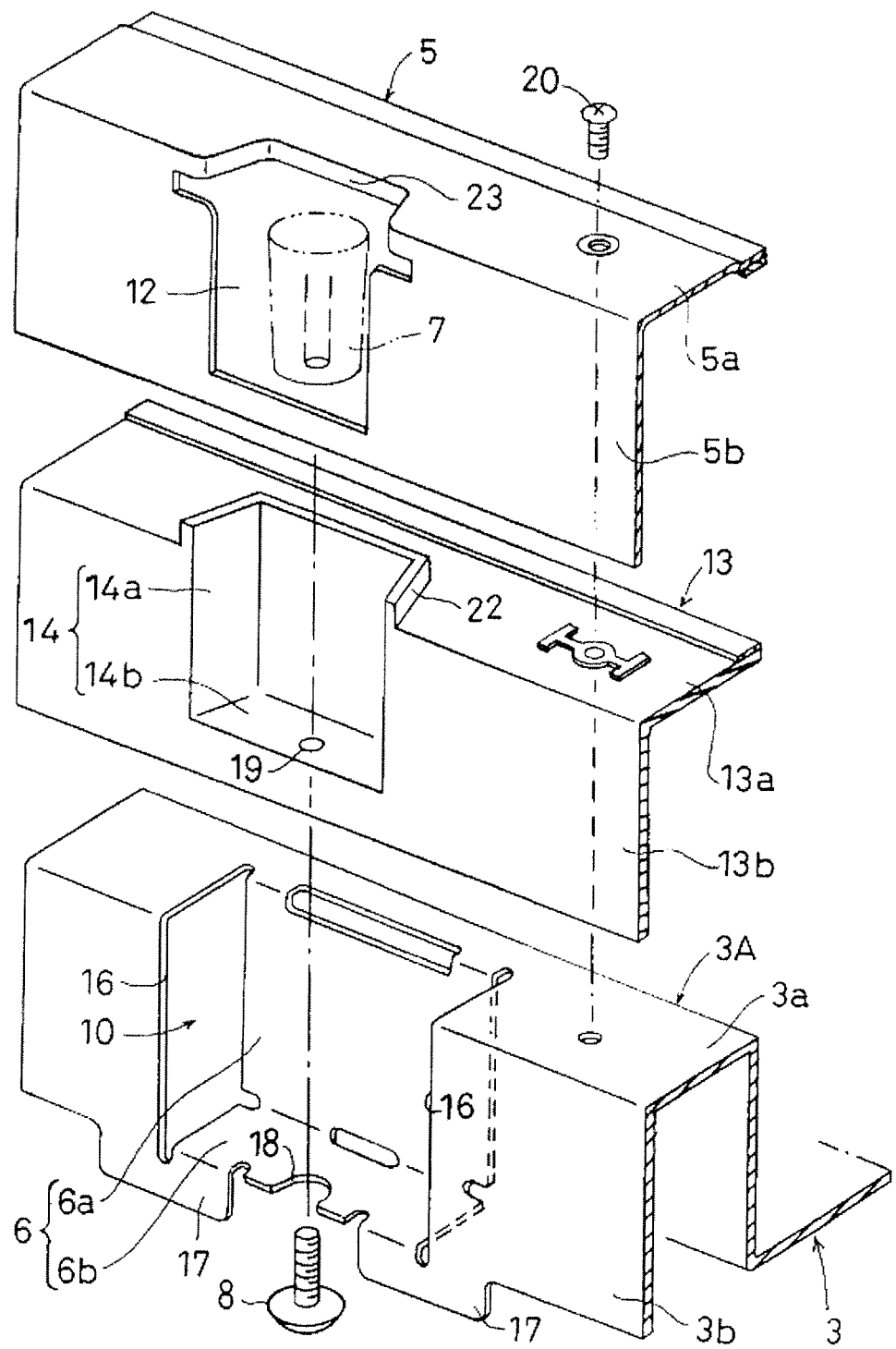
FIG. 5 is an enlarged exploded perspective view of the display device illustrated in FIG. 1.
Figure 6:
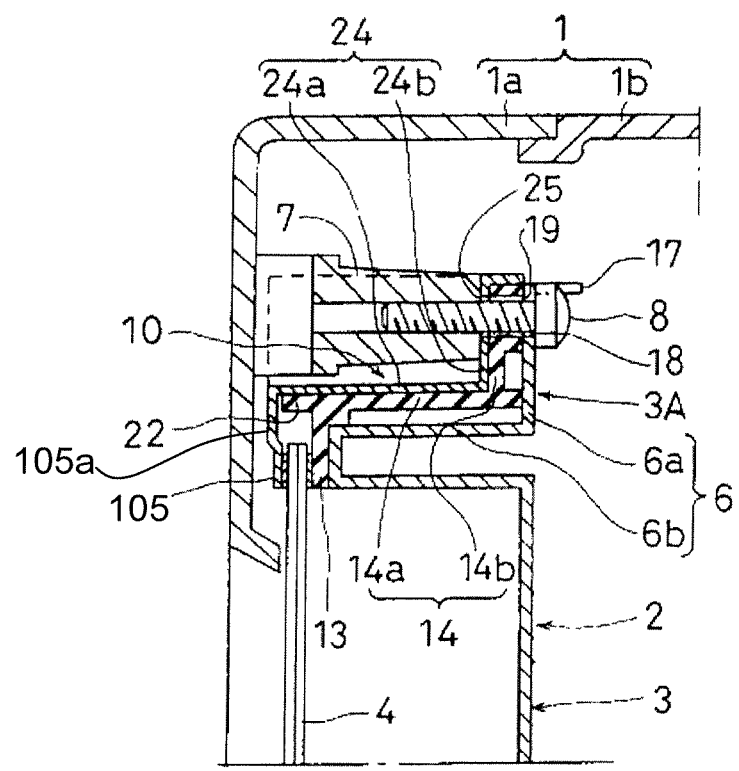
FIG. 6 is a partial cross sectional view of a display device in accordance with a second embodiment.

The rear frame 3 has outer peripheral parts 3A to 3D on top, bottom, left and right of the rear frame 3, respectively. The rear frame 3 is integrally formed as a one-piece, unitary member. A pair of recesses (e.g., recess portions) 10 are provided at a specific spacing in the (top) outer peripheral part 3A out of the outer peripheral parts 3A to 3D. The fixing components 6 are formed in the recesses 10, respectively. As illustrated in FIGS. 5 and 6, the bezel 5 has a front plate 5a and an outer peripheral plate 5b. The bezel 5 further has a pair of communicating holes 12 that passes from the front plate 5a to the outer peripheral plate 5b of the bezel 5. The communicating holes 12 are formed at locations that face the recesses 10, respectively. The bezel 5 is integrally formed as a one-piece, unitary member. As illustrated in FIGS. 5 and 6, the cell guide 13 has a front plate 13a and an outer peripheral plate 13b. The cell guide 13 further has a pair of cell guide linking components 14 that protrude integrally from the front plate 13a to the outer peripheral plate 13b. The cell guide 13 is made from a synthetic resin and has a substantially L-shaped lateral cross section. The cell guide linking components 14 are inserted into the recesses 10, respectively. The cell guide 13 is formed as a one-piece, unitary member. The bosses 7 of the front cabinet 1a are inserted through the communicating holes 12 of the bezel 5 into the recesses 10.

As illustrated in FIGS. 2 to 5, the upper outer peripheral part 3A of the rear frame 3 is formed with a substantially U-shaped lateral cross section. The rear frame 3 further has two pairs of slits 16 that are aligned at a specific spacing from the front plate 3a to the outer peripheral plate 3b of the upper outer peripheral part 3A. Each of the fixing components 6 is formed between respective one pair of slits 16. The fixing components 6 are bent in an approximate L shape to form the recesses 10.

As illustrated in FIGS. 2 to 5, each of the fixing components 6 has a side plate 6a that extends in a depth direction of the rear frame 3 (i.e., rearward of the rear frame 3 relative to the front plate 3a), and a bottom plate 6b that is bent outward at a right angle from a rear edge portion of the side plate 6a. The rear frame 3 further has a plurality of reinforcing tabs 17. The reinforcing tabs 17 are integrally formed with the rear frame 3 between the outer edge portions of the bottom plates 6b and the rear edge portions of the outer peripheral plate 3b of the rear frame 3. The reinforcing tabs 17 are bent so as to lie in the same plane as the outer peripheral plate 3b. Each of the bottom plates 6b has a screw insertion hole (or notch) 18 (e.g., first screw receiving portion) for inserting the screw 8. The screw insertion holes 18 are formed in a center portion at the outer edge portions of the bottom plates 6b, respectively.

With the display device, because the slits 16 are formed between the fixing components 6 and the rear frame 3, this structure does leave the fixing components 6 less than securely supported. However, reinforcing with the reinforcing tabs 17 allows for secure fastening to the bosses 7 without any deformation of the fixing components 6.

As illustrated in FIGS. 2 to 5, each of the cell guide linking components 14 has a U-shaped frame body 14a and a bottom plate 14b. The U-shaped frame bodies 14a are integrally formed with the front plate 13a and the outer peripheral plate 13b of the cell guide 13 and are inserted into the recesses 10, respectively. The bottom plates 14b are integrally formed with the U-shaped frame bodies 14a at rear ends of the U-shaped frame bodies 14a, respectively. Screw insertion holes (e.g., second screw receiving portions) 19 are formed in the bottom plates 14b, respectively.

The assembly procedure will now be described. The liquid crystal panel 4 is disposed via the cell guide 13 in the front opening of the rear frame 3. The backlight (not shown) is disposed in the interior of the rear frame 3. The bezel 5 is fastened to the outer peripheral parts 3A to 3D of the rear frame 3 with screws 20, respectively, such that the bezel 5 covers the outer peripheral edge of the liquid crystal panel 4. As a result, the liquid crystal module 2 is assembled. Then, the liquid crystal module 2 is grasped, and the bosses 7 are fitted loosely into the recesses 10. Furthermore, the screws 8 are passed through the screw insertion holes 18 and the screw insertion holes 19 and fastened to the bosses 7, which fixes the liquid crystal module 2 to the front cabinet 1a. Then, the rear cabinet 1b is attached to the front cabinet 1a, which forms the display device.

With the display device, the fixing components 6 are provided in the recesses 10 that are provided at a specific spacing to the upper outer peripheral part 3A of the rear frame 3, and the fixing components 6 do not stick out beyond the outer peripheral plate 3b of the rear frame 3. Thus, there is no risk that the fixing components 6 will be bent or broken by contact with the assembly machinery or the like in the course of the liquid crystal module 2 being conveyed in the assembly process. Therefore, the yield of the liquid crystal module 2 can be kept high.

Also, the fixing components 6 and the cell guide linking components 14 formed integrally on the cell guide 13 are fastened together on the bosses 7. Thus, the liquid crystal module 2 can be adequately reinforced. Therefore, even if it should be subjected to an impact or a heavy load during its conveyance, there will be no deformation or malfunction of the liquid crystal module 2.

Figure 3:
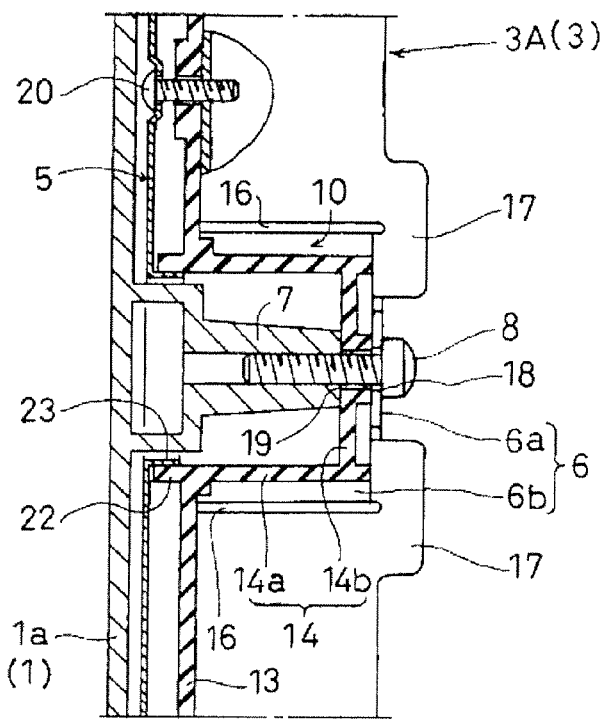
FIG. 3 is a partial cross sectional view of the display device taken along line in FIG. 2.
Figure 4:
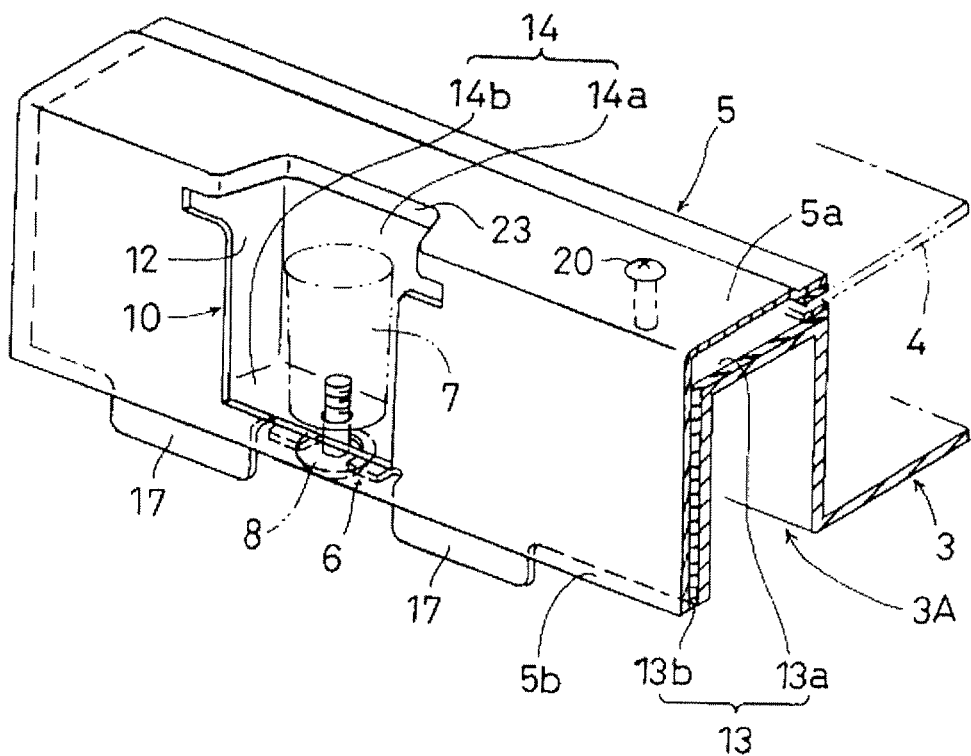
FIG. 4 is an enlarged perspective view of the display device illustrated in FIG. 1.

As illustrated in FIGS. 3 to 5, the cell guide 13 further includes a pair of protrusions 22 protruding integrally from the outer peripheral edges of the cell guide linking components 14 toward the bezel 5, respectively, and the bezel 5 further includes a pair of bent tabs (e.g., bent portion) 23 that are bent from the peripheral edge of the communicating holes 12 to the cell guide 13. The protrusions 22 and the bent tabs 23 are made to overlap one another. Thus, the gap between the cell guide 13 and the bezel 5 can be blocked from the recesses 10, and consequently, this prevents noise from penetrating between the cell guide 13 and the bezel 5. Therefore, malfunction of the driver IC or other such electronic device disposed between these can be further prevented.

Second Embodiment

Referring now to FIG. 6, a display device having a modified bezel 105 in accordance with a second embodiment will now be explained. The bezel 105 of this second embodiment is utilized in place of the bezel 5 of the first embodiment.

In view of the similarity between the first and second embodiments, the parts of the second embodiment that are identical to the parts of the first embodiment will be given the same reference numerals as the parts of the first embodiment. Also, parts of this second embodiment that are functionally identical and/or substantially identical to parts of the first embodiment will be given the same reference numerals but with "100" added thereto. In any event, the descriptions of the parts of the second embodiment that are substantially identical to the parts of the first embodiment may be omitted for the sake of brevity. However, it will be apparent to those skilled in the art from this disclosure that the descriptions and illustrations of the first embodiment also apply to this second embodiment, except as discussed and/or illustrated herein.

FIG. 6 illustrates the display device in accordance with the second embodiment, which is a liquid crystal television set. The bezel 105 further includes a pair of bezel linking components 24. The bezel linking components 24 protrude integrally from the bezel 105 and are inserted into the recesses 10, respectively. Each of the bezel linking components 24 has a side plate 24a and a bottom plate 24b. The side plates 24a extend in the depth direction of the rear frame 3 (rearward of the rear frame 3 relative to the front plate 105a). The bottom plates 24b are bent outwardly at a right angle from rear edge portions of the side plates 24a, respectively. The bottom plates 24b have screw insertion holes (e.g., third screw receiving portion) 25 in the centers of the bottom plates 24b, respectively. The screws 8 are fastened to the bosses 7 through the screw insertion holes (or grooves) 18 of the fixing components 6, the screw insertion holes 19 of the cell guide linking components 14, and the screw insertion holes 25 of the bezel linking components 24, thereby fixing the liquid crystal module 2 to the front cabinet 1a.

With the display device, because the bezel linking components 24, the cell guide linking components 14, and the fixing components 6 are fastened together by the screws 8 to the bosses 7, the liquid crystal module 2 can be reinforced even better.

Figure 7:
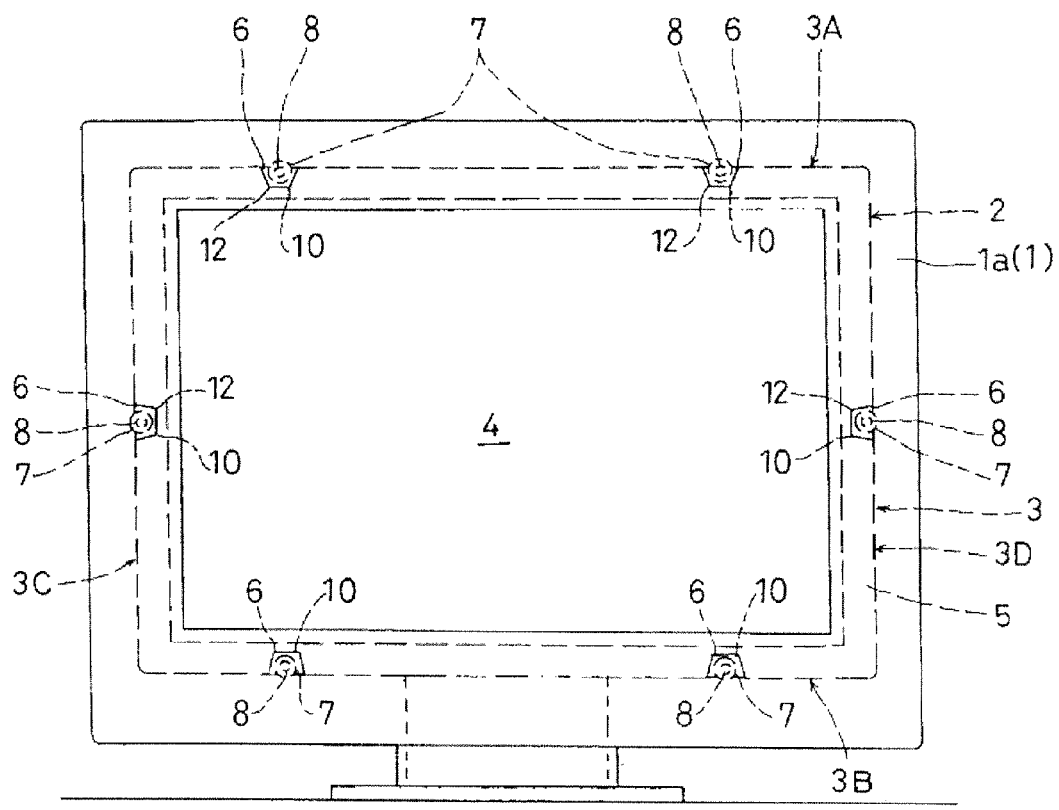
FIG. 7 is a front elevational view of a modified display device in accordance with the first and second embodiments.

With the above embodiments, the pair of recesses 10 is formed in the upper outer peripheral part 3A of the rear frame 3. However, this is not the only option. As illustrated in FIG. 7, the recesses 10 can also be foimed in the lower outer peripheral part 3B and the left and right outer peripheral parts 3C and 3D of the rear frame 3, respectively. In this case, the fixing components 6 are also formed at corresponding locations to the recesses 10, respectively, and are disposed inside the recesses 10, respectively. Then, the fixing components 6 can be fastened with the screws 8 to the bosses 7, which are also foimed at corresponding locations to the recesses 10.

GENERAL INTERPRETATION OF TERMS

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a display device equipped with the present invention. Accordingly, these terms, as utilized to describe the present invention should be interpreted relative to a display device equipped with the present invention as used in the normal operating position.

While selected embodiments have been chosen to illustrate the present invention, it will be apparent to those skilled in the art from these disclosures that various changes and modifications can be made herein without departing from the scope of the invention as defined in the appended claims. Furthermore, the foregoing descriptions of the selected embodiments according to the present invention are provided for illustration only, and not for the purpose of limiting the invention as defined by the appended claims and their equivalents.

What is claimed is:

1. A display device comprising:
   a cabinet with a front cabinet and a rear cabinet, the front cabinet having a rear face and a plurality of bosses that is integrally formed on the rear face; and
   a display device main body disposed inside the cabinet, the display device main body having
      a rear frame with a front opening, the rear frame having a plurality of recess portions that is provided at a specific spacing along an outer peripheral part of the rear frame,
      a cell guide disposed on the rear frame, the cell guide including a plurality of cell guide linking components, the cell guide linking components being disposed inside the recess portions, respectively, each of the cell guide linking components having a side face,
      a display panel disposed via the cell guide in the front opening of the rear frame,
      a bezel disposed on an outer peripheral edge portion of the display panel, the bezel being fastened to the outer peripheral part of the rear frame, and
      a plurality of fixing components provided at a specific spacing along the outer peripheral part of the rear frame, the fixing components being disposed in the recess portions and fastened to the bosses, respectively, each of the fixing components having a side plate that extends in a depth direction of the rear frame, the side plates of the fixing components being disposed inward of the rear frame relative to an outer peripheral plate of the outer peripheral part of the rear frame, the side plates of the fixing components being disposed inward of the rear frame relative to the side faces of the cell guide linking components of the cell guide, respectively, such that the side plates of the fixing components facing with the side faces of the cell guide linking components of the cell guide, respectively, in a direction perpendicular to the depth direction of the rear frame.

2. The display device according to claim 1, further comprising
   a plurality of screws fastening the fixing components to the bosses, respectively,
   each of the fixing components further having a bottom plate that extends from the side plate, each of the bottom plates having a first screw receiving portion with the screws extending through the first screw receiving portions of the bottom plates and fastened to the bosses, respectively.

3. The display device according to claim 2, wherein
   each of the cell guide linking components has a second screw receiving portion, the screws further extending through the second screw receiving portions of the cell guide linking components, respectively.

4. The display device according to claim 3, wherein
   the bezel includes a plurality of bezel linking components, the bezel linking components being disposed inside the recess portions, respectively, each of the bezel linking components having a third screw receiving portion, the screws further extending through the third screw receiving portions of the bezel linking components, respectively.

5. The display device according to claim 2, wherein
   each of the fixing components is formed between a pair of slits formed at a specific spacing along the outer peripheral part of the rear frame such that the fixing components are inwardly disposed relative to the outer peripheral plate of the outer peripheral part of the rear frame to form the recess portions.

6. The display device according to claim 5, wherein the display device main body further has a plurality of reinforcing tabs that is integrally formed with the rear frame between outer edge portions of the bottom plates and rear edge portion of the outer peripheral plate of the outer peripheral part of the rear frame.

7. The display device according to claim 6, wherein each of the cell guide linking components has a second screw receiving portion, the screws further extending through the second screw receiving portions of the cell guide linking components, respectively.

8. The display device according to claim 7, wherein the bezel includes a plurality of bezel linking components, the bezel linking components being disposed inside the recess portions, respectively, each of the bezel linking components having a third screw receiving portion, the screws further extending through the third screw receiving portions of the bezel linking components, respectively.

\* \* \* \* \*